(12) United States Patent
Di Crescenzo et al.

(10) Patent No.: US 9,404,315 B2
(45) Date of Patent: Aug. 2, 2016

(54) METHOD AND CONNECTOR ASSEMBLY FOR CONNECTING TUBULAR MEMBERS

(71) Applicant: SHELL OIL COMPANY, Houston, TX (US)

(72) Inventors: Daniele Di Crescenzo, Rijswijk (NL); Michael Shuster, Voorburg (NL); Dayeeta Roy, Rijswijk (NL)

(73) Assignee: Shell Oil Company, Houston, TX (US)

( * ) Notice: Subject to any disclaimer, the term of this patent is extended or adjusted under 35 U.S.C. 154(b) by 104 days.

(21) Appl. No.: 14/407,788

(22) PCT Filed: Jun. 20, 2013

(86) PCT No.: PCT/EP2013/062851
§ 371 (c)(1),
(2) Date: Dec. 12, 2014

(87) PCT Pub. No.: WO2013/186400
PCT Pub. Date: Dec. 19, 2013

(65) Prior Publication Data
US 2015/0152691 A1 Jun. 4, 2015

(51) Int. Cl.
*F16L 19/00* (2006.01)
*E21B 17/08* (2006.01)
*E21B 43/10* (2006.01)
*F16L 13/08* (2006.01)

(52) U.S. Cl.
CPC .............. *E21B 17/085* (2013.01); *E21B 17/08* (2013.01); *E21B 43/106* (2013.01); *F16L 13/08* (2013.01)

(58) Field of Classification Search
CPC ....... F16L 13/14; F16L 13/147; F16L 13/168; E21B 43/103; E21B 43/106; E21B 17/085; E21B 17/042; B23K 1/00; B23K 1/20; B23K 1/008; B23K 2201/04; B23K 2201/06; B23K 20/04; B23K 20/001; B23K 20/02; B23K 20/021; B23K 1/206

USPC ............... 228/164–174, 193–195, 120, 135, 228/245–255, 248.1; 285/291.1, 290.5, 285/289.5, 333, 334; 166/384, 242.6, 380; 29/890.14; 428/544
See application file for complete search history.

(56) References Cited

U.S. PATENT DOCUMENTS

| | | | |
|---|---|---|---|
| 2,539,056 A * | 1/1951 | Brown | E21B 17/042 285/381.1 |
| 4,688,832 A * | 8/1987 | Ortloff | E21B 17/0423 285/148.19 |
| 4,962,579 A * | 10/1990 | Moyer | E21B 17/042 285/334 |
| 5,212,885 A | 5/1993 | Buonodono et al. | |
| 5,895,079 A * | 4/1999 | Carstensen | F16L 47/16 285/148.13 |
| 6,047,997 A * | 4/2000 | Olivier | F16L 15/08 285/331 |
| 6,419,147 B1 | 7/2002 | Daniel | |
| 6,514,631 B1 * | 2/2003 | Yamamoto | B23K 20/02 138/142 |
| 6,746,057 B2 * | 6/2004 | Goto | C10M 169/02 285/333 |
| 6,860,420 B2 * | 3/2005 | Filippov | B23K 20/16 228/246 |
| 7,452,007 B2 * | 11/2008 | Hashem | E21B 43/103 166/207 |
| 7,464,449 B2 * | 12/2008 | Santi | E21B 17/042 277/602 |
| 7,866,706 B2 * | 1/2011 | Goto | C10M 103/00 285/333 |
| 8,177,262 B2 * | 5/2012 | Sivley, IV | E21B 43/106 285/334 |
| 9,057,226 B2 * | 6/2015 | Szpunar | E21B 17/085 |

(Continued)

FOREIGN PATENT DOCUMENTS

WO 2005071212 8/2005

*Primary Examiner* — Beth Stephan

(57) ABSTRACT

The invention provides a method of joining tubular members.

16 Claims, 4 Drawing Sheets

(56) References Cited

U.S. PATENT DOCUMENTS

| | | | | |
|---|---|---|---|---|
| 2002/0014514 A1* | 2/2002 | Shimizu | B23K 31/12 228/104 |
| 2003/0047588 A1* | 3/2003 | Filippov | B23K 20/16 228/120 |
| 2003/0168858 A1* | 9/2003 | Hashem | E21B 43/103 285/334 |
| 2004/0195826 A1* | 10/2004 | Goto | C23C 24/08 285/94 |
| 2005/0093250 A1* | 5/2005 | Santi | E21B 17/042 277/602 |
| 2005/0172472 A1* | 8/2005 | Verger | E21B 43/103 29/507 |
| 2008/0136181 A1* | 6/2008 | Costa | F16L 13/168 285/382.1 |
| 2009/0205839 A1* | 8/2009 | Cook | E21B 43/103 166/382 |
| 2011/0041581 A1* | 2/2011 | Santi | E21B 17/042 72/53 |
| 2011/0042946 A1* | 2/2011 | Santi | F16L 15/004 285/333 |
| 2013/0292132 A1* | 11/2013 | Szpunar | E21B 17/085 166/367 |

* cited by examiner

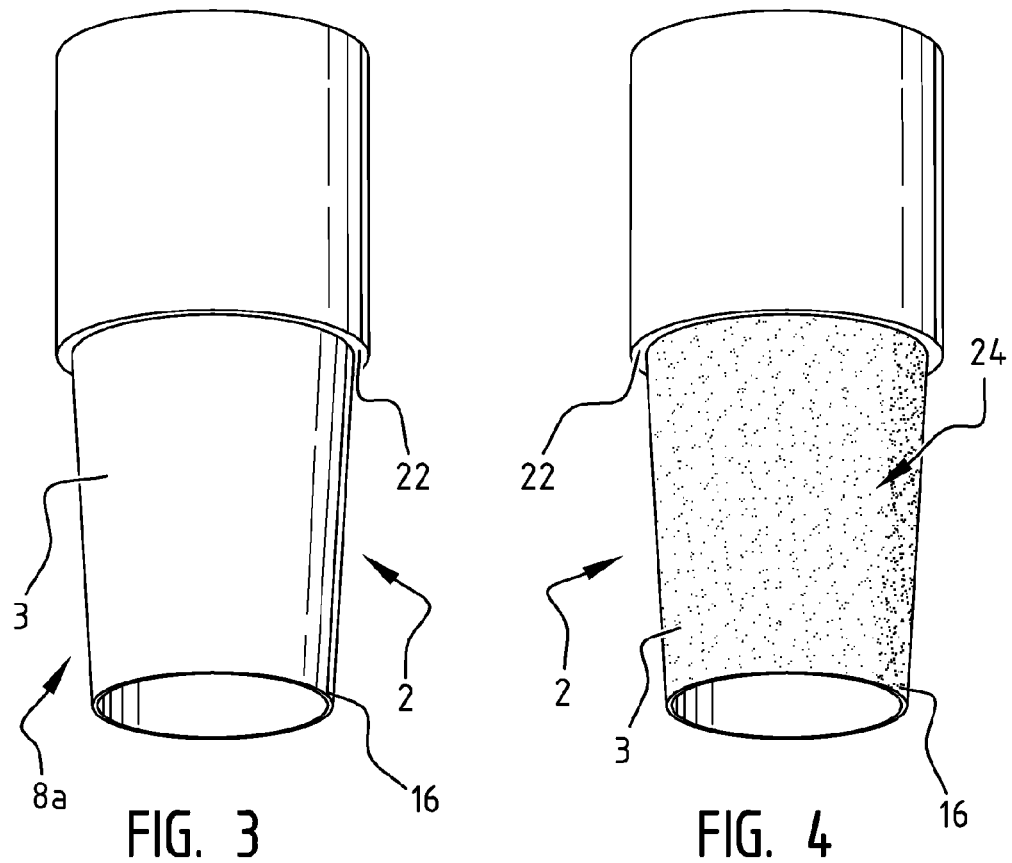
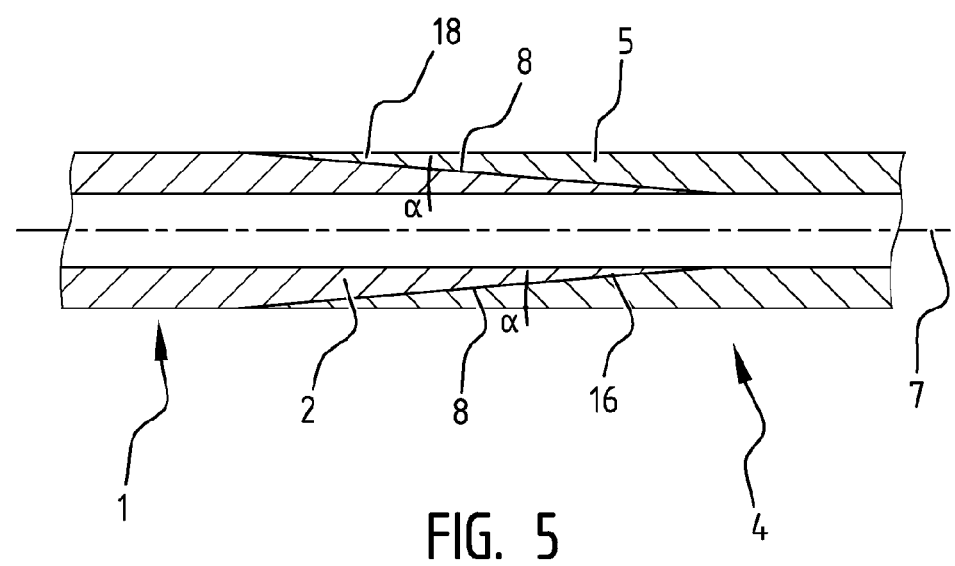

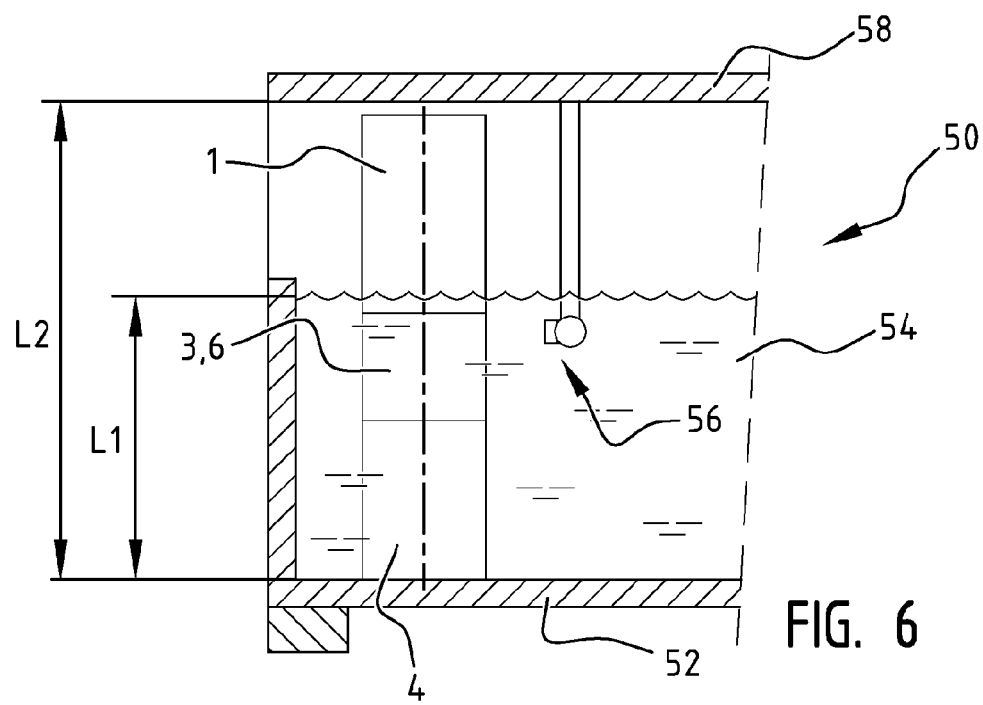
FIG. 6
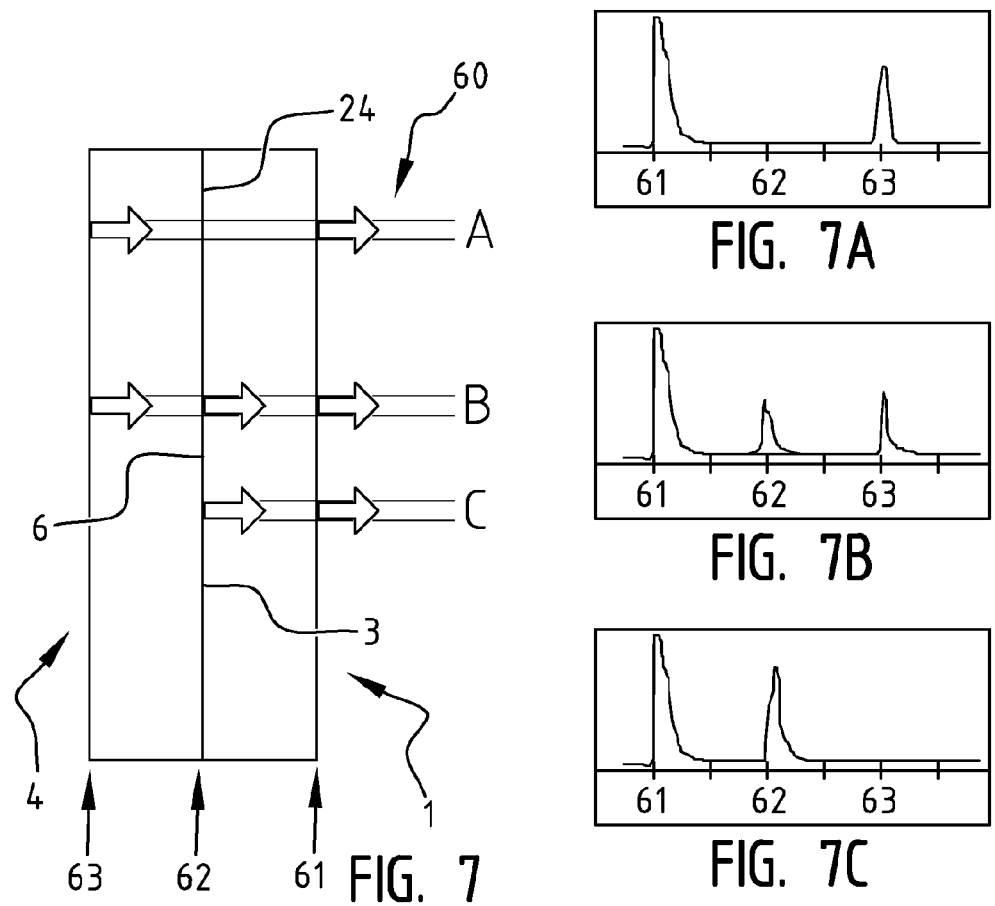
FIG. 7
FIG. 7A
FIG. 7B
FIG. 7C

METHOD AND CONNECTOR ASSEMBLY FOR CONNECTING TUBULAR MEMBERS

CROSS-REFERENCE TO RELATED APPLICATIONS

The present application is a National Stage (§371)of International Application No. PCT/EP2013/062851, filed Jun. 20, 2013, which claims priority from European Application No. 12172227.6, filed Jun. 15, 2012, the disclosures of each of which are hereby incorporated by reference in their entirety.

The present invention relates to a method for connecting tubular members and to a connector assembly made-up using said method.

BACKGROUND OF THE INVENTION

The connector typically includes a pin member and a box member. The pin member may have a threaded outer surface and the box member may have a corresponding threaded inner surface allowing the pin member and box member to be connected, forming a threaded connection. Connectors of this type are generally used in oilfield applications, for instance to connect sections of wellbore casing or production tubing. Often, connectors for oilfield applications are required to provide liquid-tight and/or gas-tight sealing and to have a strength at least approximately equal to the body strength of the pipe sections joined by the connectors.

Recently, expandable tubular technology has become commercially available. Herein, expandable pipes are radially expanded downhole. The outer diameter of the pipes are increased, for instance, in the range of about 10% to 25%. Many wells have already been cased or lined using expandable tubulars. Expandable tubulars—such as expandable casings or liners—are typically also comprised of pipe sections which are interconnected using threaded connections. Each pipe section typically has a length in the order of 10 metres.

An API (American Petroleum Institute) threaded connector is a commonly used type of connector which performs relatively well at relatively low cost. The API connector however may not always provide reliable gas-tight sealing. In view thereof the API threaded connectors are primarily used for liquid service applications, while more expensive connections, so-called premium connectors, are typically used for applications where gas-tight sealing is required, for instance in production casing or production tubing of gas wells. Most conventional premium connectors have specially designed threads, and rely on metal-to-metal interference for leak tight sealing.

In order to improve the gas sealability of API threaded connectors it has been proposed to apply a soft metal plating to the threaded surfaces. Examples of such plating material include zinc phosphate, zinc and tin. U.S. Pat. No. 5,212,885 discloses a threaded connector wherein the threaded section of each pin member is marked with a band, and wherein the threaded surface of the box member is plated with tin. A thread lubricant is applied to the threads of the box member, and the pin and box members are screwed together until the face of the box member overlaps the band. The connection is considered acceptable if the face of the box member is properly positioned over the band on the pin member, and if the make-up torque is within predetermined limits. Proper make-up of the connector of U.S. Pat. No. 5,212,885 may be difficult or impossible if the coating layer is too thick, and unallowable deformation of the pin member or the box member may occur. The make-up torque can become excessive and poor thread engagement can occur which negatively impacts performance of the connector. This connector is unsuitable to be expanded and will probably leak after expansion.

To ensure leak tightness after expansion, expandable pipes typically comprise premium connectors. Still, the connectors often are the weakest link in the expansion process mainly due to the complicated stress distribution along the thread profile during expansion. Severe plastic deformation during the expansion process may totally destroy the sealing mechanism of the connector, including the metal-to-metal seal of a premium connector. Hence the need arises to develop alternative connections which can survive high expansion ratios (up to 30% or even 35% in some cases) and be leak tight (liquid tight and preferably gas tight) after expansion.

U.S. Pat. No. 6,417,147 discloses a combination of a mechanical and metallurgical connection for joining members such as conduits wherein amorphous diffusion bonding material is placed at mating or abutting surfaces in the mechanical joint. The bonding material is compressed under pressure and heat is applied to cause the bonding material to diffuse into the mechanical connection.

U.S. Pat. No. 6,860,420 discloses a method of interconnecting a pair of metal oilfield tubulars having complementary tapered edges. The tapered edge of at least one of the tubulars at the common contact surface thereof is provided with a thin layer of a metal having a melting temperature lower than the melting temperature of the tubular. The tubulars are interconnected, and heat is applied to the thin layer of metal to melt the thin layer of metal, followed by cooling the tapered edges wherein a metallurgical bond is created between the tubulars. Subsequently the tubular are radially expanded in the wellbore.

As resources become ever scarcer, recently wells have been drilled in ever more challenging environments. For instance, wellbores have been drilled in deep water and/or in high pressure hydrocarbon reservoirs. Deep water herein may indicate more than 1 km water depth. High pressure may for instance indicate reservoirs at a pressure of more than 100 bar. However, pressures up to 400 bar or more are not uncommon, in exceptional cases even exceeding 1200 bar. To render matters worse, the hydrocarbons in the reservoirs may comprise contaminations, typically including corrosive and/or toxic gasses such as H2S or CO2. The expanded tubing, including the expanded connections, is expected to contain said gases up to the maximum pressure to which the tubing in a worst case may be exposed.

Based on a challenging drilling scenario, for instance in the Gulf of Mexico, it was also established through computer modelling that the connections should preferably be able to survive a drilling torque. Rotating the tubing may be required to introduce the tubing into the well beyond a threshold depth. For example, a pipe having an outer diameter (OD) of 5.5 inch may be required to withstand a torque of about 7000 ft-lbs (about 9.5 kNm) or more. Rotating the pipe may be required to be able to introduce the pipe more than about 3,000 feet into the wellbore.

There is currently no connection available in the market that can survive expansion and remain leak tight after expanding the outer diameter about 20% or more. However, the challenging drilling scenarios presented above have created a need for connections which can be leak-tight, and preferably gas-tight, after expansion.

SUMMARY

It is an object of the present invention to provide an improved method of connecting tubular members.

In accordance with the invention there is provided a method of joining tubular members, comprising the steps of:

providing a first tubular member having a first end connection part;

providing a second tubular member having a second end connection part configured to make-up a connection with the first end connection part;

placing an amount of filler material on at least a portion of a mating surface of at least one of the first end connection part and the second end connection part;

joining the first and second tubular member by making-up the first end connection and the second end connection while applying a first torque, wherein the filler material is compressed between the first end connection and the second end connection;

heating the joined first end connection and second end connection to a first temperature below the melting temperature of the filler material;

applying a second torque, exceeding the first torque;

raising the temperature to a second temperature at or above the melting temperature of the filler material to cause diffusion bonding among the filler material and the first and second end connection;

lowering the applied second torque; and cooling the first and second end connections.

The invention relates to a method of interconnecting a pair of metal oilfield tubulars having complementary tapered edges with a common contact surface when the tubulars are interconnected. The tapered edge of at least one of the tubulars at the common contact surface thereof is provided with a thin layer of a filler material having a melting temperature lower than the melting temperature of the tubular. The layer of filler material is heated to melt the thin layer. Herein a metallurgical bond is created between the tubular end connection parts. The method creates a relatively strong bond as well as a reliable metal-to-metal seal between the end parts at their common contact surface.

Suitably the filler material may be selected from a material suitable for brazing, soldering, amorphous bonding or diffusion welding so as to form said metallurgical bond. The filler material for instance comprises one or more of: Fe, Ni, Cu, Ag, Ti, brass, bronze, Ge, Au, Zw, Cr, Si, B, C, P, W, Mu, Su, or an amorphous metal.

The filler material may be deposited on the end connection parts in the form of a spray, paint, foil, tape, ring, grease or suspension in a suitable gel.

The heat to melt the filler material can be applied, for example, by means of a flame, inductive heating, chemical reaction, heat convection or an electrical resistance process. In a preferred embodiment, the heat is applied using inductive heating. The filler material may be deposited on the first and/or second connection ends using thermal spraying.

Suitably the angle of intersection of the tapered end connection parts with the longitudinal axes of the tubulars is in the range of from 1 to 10°, more preferably from 3 to 6°.

In an embodiment, the joined tubular members, including the joined first and second end connections, are radially expanded. Such expansion process can take place in a wellbore formed in the earth formation, for example in order to create an expanded casing or liner in the wellbore.

According to another aspect, the invention provides a connector assembly, comprising:

a first tubular having a first end connection part; a second tubular having a second end connection part make-up to the first end connection part; and an amount of filler material on at least a portion of a mating surface of at least one of the first end connection part and the second end connection part;

the assembly being joined using the method described above.

According to another aspect, the present invention relates to a hydrocarbon wellbore provided with a series of tubular members which have been mutually connected using the method of the present invention.

DESCRIPTION OF THE DRAWINGS

The invention will be described hereinafter in more detail and by way of example, with reference to the accompanying drawings in which:

FIG. 3 shows a perspective view of another embodiment of an end connection part to be used in the method of the invention;

FIG. 4 shows a perspective view of the end connection part of FIG. 3 after application of filler material;

FIG. 5 shows a cross-section of assembled end connection parts;

FIG. 6 shows a cross-section of an embodiment of a method for non-destructive quality control;

FIG. 7 shows examples of test results of the method of FIG. 6;

DETAILED DESCRIPTION

Figure 1:
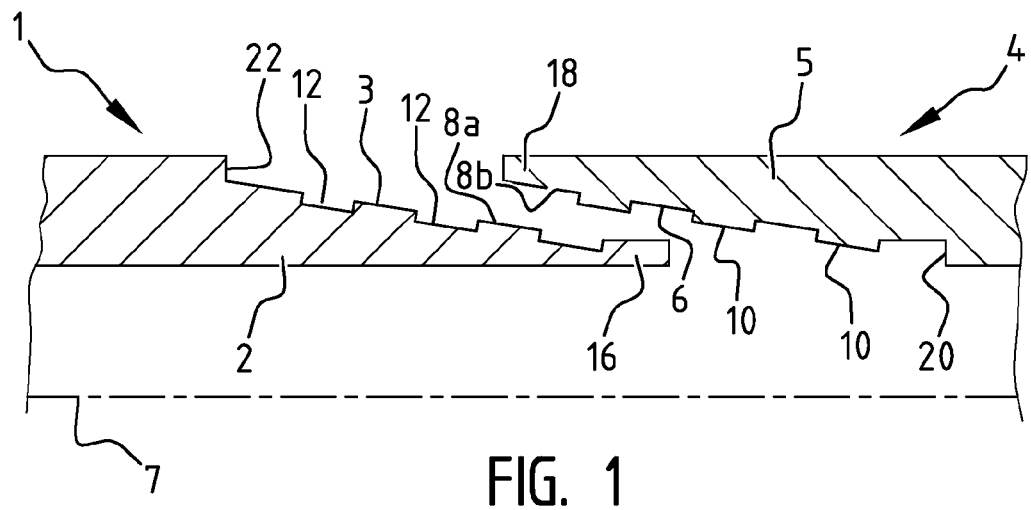
FIG. 1 shows a longitudinal cross-section of an embodiment of first and second end connection parts of tubular members to be used in the method of the invention, before make-up.
Figure 2:
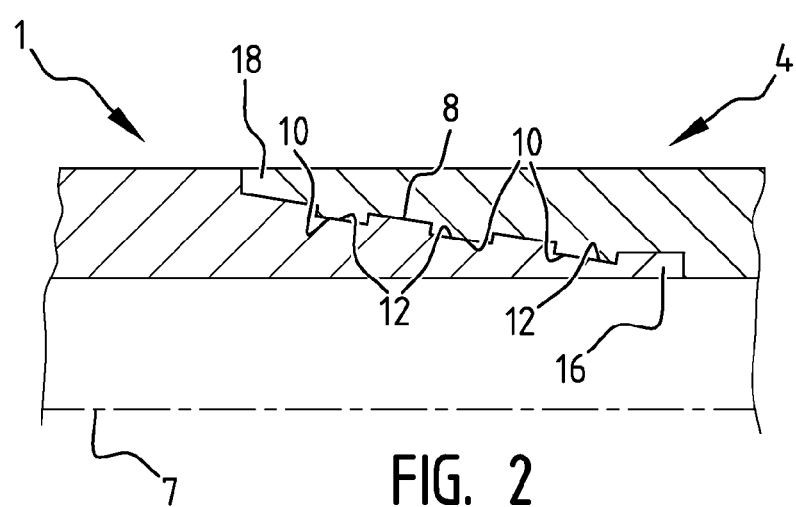
FIG. 2 shows a longitudinal cross-section of the end connection parts of FIG. 1 after make-up.

FIGS. 1 and 2 show an embodiment of a first tubular member 1 provided with a first end connection part 2. The first end connection part is a male connection part having first tapered edge or surface 3. A second tubular member 4 comprises second end connection part provided with a second tapered edge or surface 6 which is complementary to the first tapered edge 3. The tapered edges form a pin and box type stab-in connector wherein the first tapered edge 3 is the pin member of the connector and the second tapered edge 6 is the box member of the connector. The tubular members 1, 4 are aligned and have a common longitudinal axis 7.

The tapered edges 3, 6 have a common contact surface 8 (FIG. 2) when the end connection parts 2, 5 are interconnected. In FIG. 1 the individual surfaces of the first and second tapered edges 3, 6 which form the common contact surface 8 are indicated by respective reference signs 8a, 8b. The contact surfaces 8a, 8b may be provided with complementary threads, comprising ribs 10 and grooves 12.

The pin member 2 may have an end portion in the form of lip 16. The box member 5 may have an end portion in the form of lip 18. The box member 5 may have a shoulder 20. The pin member 2 may have a shoulder 22. When made-up, the lip 16 of the pin member preferably engages the shoulder 20 of the box member and/or the lip 18 of the box member engages the shoulder 22 of the pin member.

A relatively thin layer of a filler material (not shown) having a melting temperature lower than the melting temperature of the tubular members 1, 4 is deposited on at least a part of the tapered surface 3 and/or 6 prior to make-up of the pin member 2 and the box member 5. Said filler material may for instance be deposited in one or more of the grooves 12.

In a preferred embodiment, the melting temperature of the filler material is lower than the transition temperature. The transition temperature may be about 723 degree C. The base material, i.e. the material of the pipe, is preferably steel.

The layer of filler material may include a Copper based alloy or a Nickel based alloys. Alternatively, the filler material may comprise another alloy or an amorphous metal. If the filler material is a brazing composition it may also contain a flux material, for instance a borate. The flux material may be embedded in the brazing composition or be distributed over the surface of the brazing composition before brazing is commenced.

The thin layer of filler material may be deposited on the contact surface 8a and/or 8b in the form of a spray, paint, tape, ring, grease or suspension in a suitable gel.

After the layer of filler material has been applied to one or both the contact surfaces 8a, 8b, or into the grooves 12, the pin member 2 is introduced in the box member 5 and screwed together wherein the ribs 10 fit into the corresponding grooves 12, as shown in FIG. 2. When the connection is made-up, heat is applied to the pin and box members 2, 5 to melt the filler material.

As shown in FIG. 3, in an alternative embodiment the tapered surfaces 3, 6 of the pin member 2 and the box member 5 respectively (FIG. 5) may be smooth. Smooth herein for instance implies that the respective surface is non-threaded. The end section 16 is indicated, as well as shoulder 22.

FIG. 4 shows the pin member 2 wherein filler material 24 is applied to the tapered surface 3. The filler material may be applied to only a section of the tapered surface. In the embodiment of FIG. 4, the entire surface 3 has been provided with filler material. The filler material has for instance been applied by spray coating or thermal spraying. The thickness of the filler material is about 0.1-0.2 mm on one or both of the pin member and the box member. In a preferred embodiment, the filler material is deposited on both the pin member and the box member.

Although not shown, the box member 5 may have a similar smooth tapered surface 6. Said tapered surface 6 may similarly be provided with a layer of filler material. I.e., one or both of the tapered surfaces 3, 6 may be provided with a layer of filler material.

FIG. 5 shows the angle α between the cross-section of the tapered surfaces 3, 6 on one hand and the common longitudinal axis 7. The angle α is preferably in the range of 2 to 10 degrees. When the tapered surfaces are smooth, an angle α in the order of about 3 degrees has proven to provide optimal bonding and strength.

Heating is preferably effected by means of a flame, inductive heating, chemical reaction, heat convection or an electrical resistance process.

For application on a drill site near a hydrocarbon wellbore, induction heating is preferred. Herein, an inductive coil may be arranged around the connection of FIG. 2.

During induction heating, an electrical current through said coil may create Eddy currents in the connection, dissipating heat. Although more heat is generated closer to the outer surface of the connection, the entire filler material will be heated due to the heat conduction of the metal of the tubular members 1, 4. To minimize fire and explosion hazards, for instance inert gas may be provided at the inner surface of the connection during heating.

As a result of this heating process the temperature of the layer of filler material is for instance raised to a temperature at or above the melting temperature of the material. The temperature is for instance within the range of about 400 to 1100° C., preferably in the range of about 600 to 700 degree C. In a preferred embodiment, the connection is heated to a temperature about 20 degree C. above the melting temperature of the filler material.

While heat is applied and the temperature is raised, a pressure may be applied between the pipe ends to be bonded, this situation being advantageously maintained during a period of time, for instance at least 10 seconds.

Brazing as a joining process can be defined as a process which joins materials (of the same or dissimilar composition) through the use of heat and a filler material. The filler material is for instance a metal or metal alloy with a melting temperature above about 450 degree C. but below the melting temperature of the base materials being joined. A successfully brazed joint can result in a metallurgical bond that is as strong as or stronger than the base metals being joined. As mentioned before, the base metal is typically steel.

The filler material is arranged in a gap between two parts to be joined. Said parts are heated up to the melting temperature of the filler material, which melts and flows into the gap, forming an alloy of the materials at the transition point, typically on solidification. This creates a metallurgical bond. The molten metal typically flows into and fills voids within the gap between the two parts by capillary action.

Like brazing, soldering does not involve the melting of the base metals. However, filler metal for soldering has a lower melting point (less than 450 degree C.). Though this may be an advantage of the soldering process, soldered joints lack a metallurgical bond and are therefore incapable of handling high stresses because the soldered joint is relatively weak.

Welding forms a metallurgical bond in a way similar to brazing. However, the filler metals used have higher melting temperatures which are typically in the same order as, or only just below the melting temperature of the base metals. Due to the relatively high temperatures, it is possible that there is some distortion in the base metals. Though welding can create a strong joint, it can also change the mechanical and metallurgical properties of the base metals due to the high temperatures.

The main advantages of brazing with respect to soldering or welding are:
  i) Relatively low melting point of filler materials;
  ii) Joins dissimilar materials;
  iii) Maintains metallurgical properties of base metals;
  iv) Compatible with conventional quality control techniques;
  v) Provides reproducible results;

However, adapting brazing for the oil industry has its own challenges. Some of them are:
  a) Making brazing suitable for big assemblies like tubular connections for oilfield tubular strings;
  b) Cleanliness effects the quality of the joint, rendering brazing a difficult technology to implement on oilfield rigs where the surroundings may not sufficiently clean;
  c) Quality control checks after brazing and before putting pipe downhole may be a challenge.

Brazing or amorphous bonding of oilfield tubulars has the following potential advantages:
  it is applicable to a wide range of materials including carbon steel, stainless steel and titanium;

no protrusions occur after bonding or brazing, hence flush connections are formed;

it can be carried out automatically, hence no skilled operators are required;

the required heat inputs are lower than for welding, improving safety and making it easier to limit risks;

it is relatively rapid;

the tubulars are automatically axially aligned;

a large bonding surface and thus a strong bond is created; and it is a cost-effective process.

For these reasons brazing or amorphous bonding of tapered edges of adjoining oilfield tubulars can be of significant benefit for joining carbon steel and corrosion-resistant alloy well casings, tubings and liners.

In order to achieve a good quality brazed joint, the process of brazing is very important. This process includes the preparation of the end connection parts to be brazed till the cleaning of the end product.

Good fit and correct clearance between the faces to be joined is an important parameter in brazing. The capillary action which is the main principle involved works most effectively when the gap between the components is optimal. For oilfield connectors, typically this gap can range from 10 microns to 100 microns. The optimum gap is specific for a particular base metal in a given set of conditions. The tensile strength of the brazed joint varies with the amount of clearance between the parts before brazing thereof.

According to tests, the strongest joints are achieved when the clearance between the two parts is less than 0.15 mm. The tensile strength may be more than 80.000 to 100.000 psi (about 550 to 700 MPa). If the gap is wider, the capillary action is reduced, so the filler metal may fail to fill the joint completely thus lowering the joint strength. The ideal clearance between the two parts before brazing is in the order of 0.001 to 0.004 inch (about 20-80 μm). Tensile strength may be in the order of 120,000 psi (about 825 MPa) or more.

Capillary action works best when the surfaces of the base metals are clean. Contaminated surfaces, for instance contaminated with dust, grease, rust or oil, hinder the flow of molten metal and result in a weaker joint. Oil prevents proper distribution of molten metal through the joint. Filler materials do not bond well to rusty surfaces. Cleaning surfaces may be done with water or organic solvents. Alternatively, mechanical removal may include abrasive cleaning. Particularly in repair brazing, where parts may be very dirty or heavily rusted, you can speed the cleaning process by using emery cloth, a grinding wheel or grit blast, followed by a rinsing operation. Once the parts are clean, flux and brazing material are preferably applied as soon as possible. This prevents recontamination of the surfaces, for instance by dust, grease or oil which may be deposited during handling.

Flux is a chemical compound applied to the joint surfaces. The primary purpose of flux is to promote wetting of the base metal by the brazing filler material. Heating a metal surface accelerates the formation of oxides, the result of chemical combination between the hot metal and oxygen in the air. It is preferred to prevent the formation of oxides, as oxides may inhibit the brazing filler metal from wetting and bonding to the surfaces. A coating of flux on the joint area will shield the surfaces from the air, preventing oxide formation. The flux will also dissolve and absorb any oxides that form during heating or that were not completely removed in the cleaning process. Fluxes are usually tailor made for a certain filler material. Chemical fluxes may comprise one or more of: Borates, elemental Boron, fluoborates, fluorides, chlorides, wetting agents, or water.

It is important to align the end connection parts in the right position to get the correct geometry of the final joint. This ensures correct distribution of the brazing filler throughout the joint by capillary action. Usually gravity can be used to hold the two tapered surfaces together. Other methods might involve a mechanical tool to hold the pieces together in the right position.

The above shows that adapting the brazing technology for the oil and gas industry can be quite a challenge. The present invention enables the development of this technology for use in oilfield applications.

The main challenges faced in brazing a threaded connection are:

a. Application of brazing alloy on the connection threads;

b. Presence of threads highly influence the distribution of the brazing material;

c. Rotation (making up of the threaded connection) simultaneously with the application of heat (induction) also influences the spread of brazing material over the connection area;

d. Establishing the process parameters to ensure repeatable performance.

Out of the various brazing materials that exist in the industry today, the most optimum materials were chosen. This was done by small scale testing. This saved time and costs, as a lot of materials and application methods could be tested in a limited amount of time. The most suitable materials were then applied on full-scale connections of oilfield pipes.

Out of the whole range of brazing alloys, silver-copper based alloys provided the highest yield strength and/or shear strength. Shear strength may be above 200 to 240 MPa (35 ksi). Yield strength may exceed 180 MPa. The table below discloses two exemplary embodiments of brazing materials providing brazed connections having yield and shear strengths in the highest range, i.e. above 180 MPa and 200 MPa respectively.

| Name of alloy | Composition | Melting range (Deg C.) |
|---|---|---|
| SilverBraz50Ni2 ™ (BAg-24) | Ag50—Cu20—Zn28—Ni2 | 660-707 |
| Brazetec 4900 ™ (BAg-21) | Ag49—Cu16—Zn23—Mn7.5—Ni4.5 | 680-705 |

A number of possible processes for the application of brazing material are available. The brazing material can be in the form of paste, foil, coatings, dippings etc. One of the most convenient and reliable ways to apply filler material is thermal spraying.

A preferred method of pre-brazing comprises thermal spraying of molten filler material. Thermal spraying herein preferably includes plasma-spraying. This method provided the best results, eliminating voids and incomplete filler formation, thus drastically decreasing a number of brazing defects during manufacture. Application of a pre-braze coating using plasma spraying of the brazing material BAg-24 may for instance be deposited using a manually operated plasma gun, optionally using argon as a shielding atmosphere. Serial production of steel tubing provided with the pre-braze coating may be performed by a robotic plasma spraying system.

Preferably surfaces are prepared before plasma spraying, for instance using sand blasting. Preparing surfaces will improve the adhesion of thermally sprayed material to the steel substrate and/or remove oxides and contaminants on the surface. Pin and box members of steel tubing may for instance be subjected to blasting with fine alumina sand in a glove chamber.

Preferably, the combined layers of the filler material to be sprayed on the pin and box of the connection together provide a filler material volume which is about equal to up to about 50% greater than the gap volume between the pin and box members of a fully made-up connection. This ensures that enough brazing material is present in the connection during brazing to fully cover the connection and have a proper joint. Excess filler material will be pushed out of the connection by pressure generated during the mechanical action of rotating the connection. In a preferred embodiment, the combined filler material volume is about 50% greater than the gap volume.

Disadvantages of depositing insufficient amounts of filler material in the connection may include:

Leaking connection;
Lower strength of the joint.

Disadvantages of depositing excess material in the connection may include:

Impossibility of making up the connection due to high required torque;
Damage (permanent plastic deformation) of the connection ends (pin and/or box);
Solid protrusion of filler material on the inside or outside of the connection after brazing;
Increased cost per connection.

According to the present invention, deposition of the filler material to the pin and/or box may include one or more of the following steps:

1) Deposition of the brazing material on the connection surfaces to maximize efficiency and consistency of the process before brazing. In this case it can be any method of deposition, such as dipping, plating, brushing, painting. Spraying is preferred, due to the easy application, the predictable process, and the repeatable thickness;

2) Sintering of the filler material after spraying to increase the bonding to the base metal and the strength of the eventual brazing by decreasing porosity and increasing cohesion (i.e. bonding between particles of brazing material).

The application of the filler material can be done in a workshop or factory, which will improve the quality and decrease the time of the eventual brazing at the rig. The tests proved that the deposition of the filler material on the connections before the real "brazing" strengthens the eventual brazed connection. This may be referred to as "prebrazing". Herein the bonding between the brazing material and the steel is already established before the final brazing of the brazing material at the wellbore.

Prebrazing is a technique wherein the filler material is deposited on the pin and/or the box (to create a diffusion bond between the base metal and the brazing alloy). Subsequently the two prebrazed surfaces are joined by brazing. This process reduces the final brazing time drastically, making it better suitable for application at a rig. The prebrazing process also ensures proper bonding of the brazed layer to the substrate.

The pre-brazing step can be performed in a clean and controllable environment such as a workshop or factory. Once the coating of filler material has been applied to one or both of the pin member and the box member in the workshop, said pin and box can be connected at the rig site within a limited time. A protective cover may be applied to the pre-brazed pin member and/or box member to keep the parts clean.

For instance, the cadmium-free brazing materials BAg-18, BAg-24 (composition provided above) and BAg-21 provided increased strength of the brazed connection.

Deposition of the filler material by dipping directly into a bath of molten filler material may encounter one or more of the following technological problems:

1) The steel tubing should be heated to a temperature above the melting temperature of the pre-brazing material. Otherwise the pre-brazing material may solidify on the tubing in the form of a non-uniform layer, which also may be too thick;

2) Brazing fluxes may have limited working time, and therefore the flux cannot be placed above the molten pre-brazing material in the same bath. Consequently, the steel tubing must be heated for contacting and reacting with the flux, then heated again (or held at the higher temperature) in order to dip the tubing into the bath of molten braze. Such mode of operation is difficult even with small size tubing and it is almost impossible with thick steel tubing, having a diameter of 6 inch or more; and 3) The filler material may only have to be deposited on one surface of the pin (outside surface 3) and/or one surface of the box (inside surface 6). However, the direct dipping method results in coatings of both the inside and outside surfaces of pin and/or box, thus consuming double the volume of relatively expensive brazing material. Herein, please note that often the brazing material comprises silver.

In an embodiment, it is possible to disconnect the connection after heating or brazing if required. Disconnecting includes:

a) The assembled connection is heated to a temperature at or above the melting temperature of the filler material (the filler material melts);

b) Rotating the first end connection part and the second end connection part with respect to each other while the assembly is at or above the melting temperature to disconnection the first end connection part from the second end connection part.

The pre-applied coating may have a thickness in the range of 0.1-0.2 mm. Good adhesion of plasma-sprayed pre-braze coatings to steel surfaces was confirmed. Thermal spraying of the filler material improves the control over the amount and distribution of the filler material.

The surfaces were prepared for plasma spraying by sand blasting, to improve the adhesion of plasma-sprayed brazing material to the steel substrate. Steel tubing and standard specimens were subjected to blasting with fine alumina sand in a glove chamber.

According to the invention, the pin and box members of the connections can be tested after application of the pre-brazing layer, or after brazing. Herein, each pin and box member can be tested, or a certain percentage thereof can be tested, depending on for instance specifications, strength of final connections, etc. For instance, at first all pre-brazed parts may be tested, and once satisfactory connections have been achieved only a set percentage of connectors may be tested.

The quality of the brazed joints is of critical importance in ensuring the proper performance of the bond. Non-destructive test methods, particularly ultrasonic techniques have been a prime area for research in determining the quality of such bonds. Ultrasonic techniques, in comparison with other non-destructive methods, offer the highest sensitivity for evaluating metallurgical bonds because acoustic properties of materials and interfaces are closely related to their elastic properties.

A procedure was adopted to control and check the quality of the brazed connection. Herein, the brazed connections are subjected to ultrasound scanning. FIG. 6 shows a testing apparatus 50 for testing the brazed connection. The testing apparatus comprises a container 52 filled with a fluid 54, such as water. An acoustic transducer 56 is mounted on a frame 58 and is moveable along the length of a sample, such as the tubular members 1, 4 including the brazed connection of surfaces 3, 6. The fluid has a height L1, which at least exceeds the length of the connection. The total height of the apparatus may be L2.

During testing, the transducer 56 sends out acoustic signals towards the pipes 1, 4. Reflections of said signals are recorded by the transducer 56, and supplied to a data processor (not shown). FIG. 7 shows reflections 60 from front wall 61, interface 62 and back wall 63. Example 7A shows good bonding, including only reflections from the front wall 61 and aft wall 63. Example 7B shows reflections from the front wall 61, interface 62 and aft wall 63, indicating mediocre quality of bonding. Example 7C shows reflections from the front wall 61 and the interface 62 indicating a lack of bonding.

The quality of brazing is highly dependent on various parameters. Besides the preparation of the parts of the connection, the brazing process itself is important. Careful control over temperature and time is mandatory to get optimal results. Brazing the threaded connections is even more complicated because of the presence of a third parameter, i.e. torque. This is because the connection is brazed while it is being made up. According to the present invention, a conjunction between torque, time and temperature is provided rendering the process and the quality of the brazed connection reproducible.

Additionally, the process of the invention may include one or more of the following steps:
  Application of different thicknesses of brazing material along the length of the (threaded) connection. This may improve the distribution of the brazing material, may compensate for tolerances and concentrate necessary material at the beginning and end of the thread. To apply a thicker layer at certain areas, one uses extra time (e.g. in the order of 2 to 10 seconds, for instance about 5 seconds) for spraying brazing material in said areas;
  Application of a reservoir for additional brazing material in a contact surface of the connection to improve the distribution of the brazed material along the length and perimeter of the threaded connection;
  Some elements of the destructive and non-destructive quality control for the brazed threaded connection.

Figure 8:
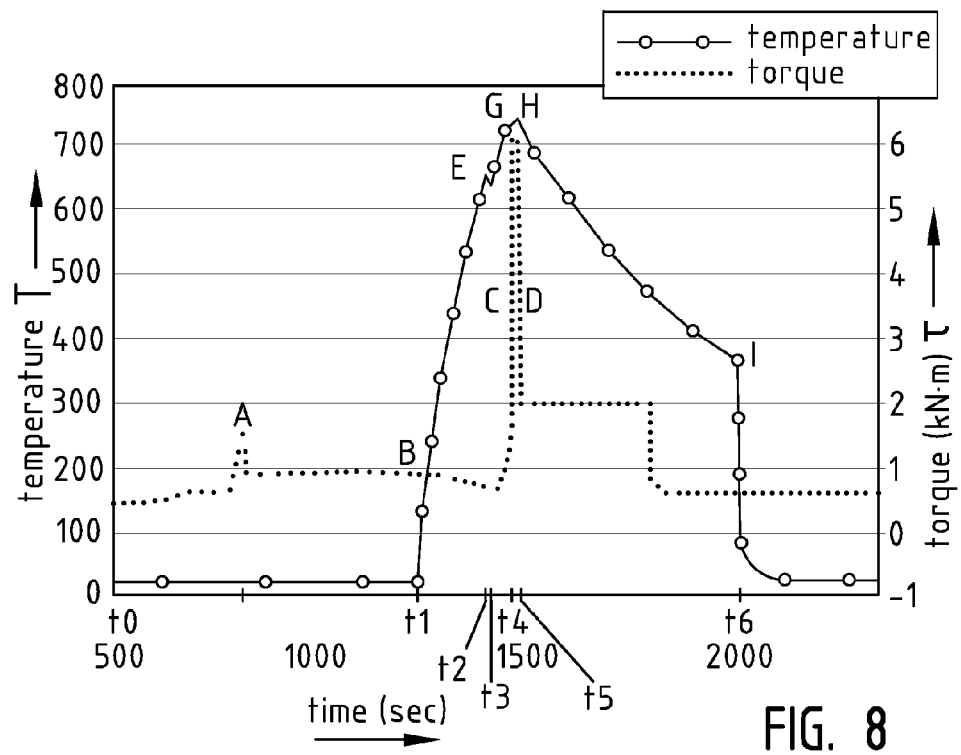
FIG. 8 shows an exemplary graph indicating the application of torque and heat during make-up of the end connection parts according to the method of the invention.
Figure 9:
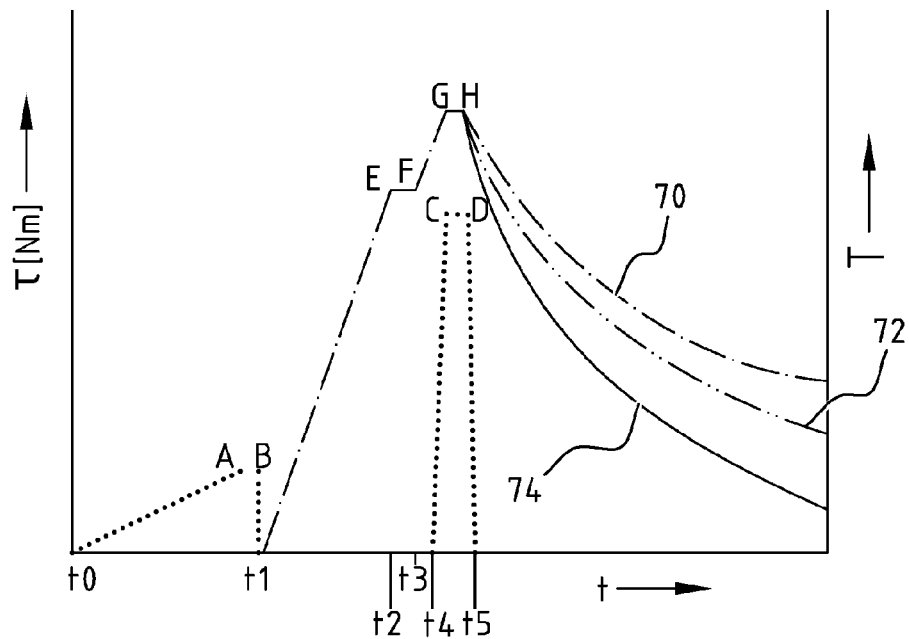
FIG. 9 shows another exemplary graph indicating the application of torque and heat during make-up of the end connection parts according to the method of the invention.

Through extensive experimentation and analysis, the process envelopes shown in FIGS. 8 and 9 have been developed. In the graphs of FIGS. 8-9, the vertical axis on the right side represents torque τ (make up), and the vertical axis on the left side represents temperature T. The horizontal axis represents time t. The dotted line represents the torque applied to the connection, while the stripe-dot line (_._) indicates the applied temperature. Both the application of torque and temperature are associated with a time factor.

The process producing connections having optimal strength and reliability generally comprises the steps of (reference to FIGS. 8, 9):
  i) At t0, apply torque to make up the pin member 2 and the box member 5 until the end 16 of the pin engages the shoulder 20 of the box and/or until the end 18 of the box engages the shoulder 22 of the pin. Engagement will be indicated by a sudden increase in or levelling of the torque at A. Application of torque indicates that the pin and box are rotated with respect to each other. This may be done for both threaded and non-threaded connections. In an embodiment, the pin and box are not completely connected, maintaining a small gap between the two parts. The small gap is for instance about 4 mm or about 2 turns;
  ii) At t1, increase the temperature up to about 75-90%, for instance 85%, of the melting temperature of the filler material;
  iii) Maintain the temperature at the level of ii) for a time period t2 to t3, to equalize the heat distribution in the connection (E to F). In an embodiment, the time (t2 to t3) which is at least required to equalize the temperature in step E-F (FIGS. 8, 9) can be calculated with the formula:

$$t = 6.4 \cdot 10^{\wedge}(-5) \cdot h \cdot [((D^2 - d^2) \cdot \pi)/4]$$

wherein: t is time in seconds; h is the height of the connection in mm; D is the OD of the pipe (in mm); and d is the ID of the pipe (in mm). ID indicates the inner diameter. The formula above was confirmed using a VAM FJL connection on 5.5" OD 9.5 mm WT pipe;
  iv) At t3, increase the temperature to about the melting temperature of the filler material, up to about 20 degree C., or 10%, higher (F to G);
  v) Apply increased torque to make up the connection. The increased torque is preferably applied when the temperature is about 90-95% of the melting temperature of the brazing material. As shown in FIGS. 8-9, the increased torque may exceed the level of torque applied at i), for example be more than three or four times higher. Again, application of torque indicates that the pin and box are rotated with respect to each other. This may be done for both threaded and non-threaded connections (C to D). The optional small gap between the two parts, which may have been left at step i), is closed;
  vi) At t5, cease to apply torque;
  vii) After a predetermined time (G to H), cease applying heat to enable the connection to cool. Cooling is preferably done naturally, by cooling to air (line 70). Cooling to air provides the strongest brazed connection. Alternatives for faster cooling include cooling by adding cooling liquid such as water. Cooling liquid can be applied in modest amounts (line) or vast amounts (line 74). The latter will cool the connection fastest, but will also produce a more brittle connection; and
  viii) Optionally, when the temperature of the assembled connector is at or below a predetermined cooling temperature I (at t6 in FIG. 8) the connector may be cooled rapidly to below 50 degree C. by supplying liquid, such as water. The cooling temperature is for instance about 350 degree C.

The combination of Torque, Temperature, and Time parameters enables the reproduction of identical successful brazed connections.

The casing and tubing strings which have been joined according to the present invention provide a leak-free, seamless, lifetime completion and potentially enable slimmer, more cost-effective wells to be pursued.

After the metallurgical bond is created between the pin member 2 and box member 5, the casings 1, 4 may be radially expanded using a suitable expansion cone or other expansion device. During the expansion process, the lip 16 of the pin member 3 and the lip 18 of the box member have a tendency to bend radially inwards due to the fact that the radially inner portions of the pin and box members are subjected to a larger circumferential strain than their respective radially outer portions. Such radially inward bending of the lip 16 of the pin member 2, and the consequent (partial) loss of the sealing capacity of the connector, is adequately prevented by the metallurgical bond created between the pin and box members.

Deposition of a coating of the filler material in a factory accelerated the assembly of brazed connections on a rig site. In practice, the connections can be made-up and brazed in about 6 minutes or less, for instance in about 4 minutes (time t0-t5 in FIGS. 8, 9). The cool down in air from the brazing temperature (for instance 30 about 700 degree C., or G-H in FIGS. 8, 9) to the cooling temperature (for instance about 350 degree C., or I in FIG. 8) may take about 15 to 20 minutes (t5 to t6 in FIG. 8).

Thus, the deposition of a coating (pre-brazing) allows depositing material outside the critical path of the connection make-up, which will make the make-up of the brazed connection faster compared to alternative brazing methods (such as brazing paste or foil) that would require this operation the be performed on the rig floor.

In an embodiment, one layer of pre-brazing material was deposited on the pin member and one layer of pre-brazing material was deposited on the box member. Said pre-brazing coatings were comprised of the same brazing material. Both pre-brazing coatings may comprise different materials though.

Threaded connections, brazed in less than 5 minutes, were able to seal more than 500 bars (7250 psi) of liquid and gas pressure after being expanded about 22% in fix-fix condition (this is the worst case scenario simulation the differential sticking in real field). Similar tests were also performed on fatigued connections (one million cycles). These connections could also be expanded 22% and remained leak tight.

Threadless connections were also brazed and expanded. The brazing materials which survived 500 bars liquid tightness included for instance electrolytically applied pure Copper and Silver.

The method of the invention enables more reliable make-up of connectors, while at the same time fluid-tight or even gas-tight sealing of the connector can be achieved, even after expansion. The method of the invention is at present the only method available wherein connections can be expanded, remain leak-tight after expansion, and survive a drilling torque of about 7000 ft-lbs (about 9.5 kNm) or more. Herein, the connections can be radially expanded about 20% or more. The connections remain leak-tight after expansion. Gas-tight herein indicates that the connection can for instance contain 500 bars of gas pressure or more after expansion.

Premium connections suitable for the present invention include for instance VAM®-FJL and Hydril513™. These are inside and outside flush integral connections providing maximum clearance with optimum strength for liners, casing, and tight-hole tubing strings. The method of the present invention enables to upgrade the connections to satisfy the functional requirements of challenging wells.

The brazing process is optimized, including for instance the conjunction of temperature, torque and time. Fixing the process parameters enables to reliably deliver identical connections and identical performances.

The method of the invention enables the use of "threadless" connections. This obviates the need for expansive premium threaded connections, thus limiting costs. Using threadless connections may cut costs by more than 50% with respect to pipes provided with premium connections.

The invention is not limited to the above-described embodiments thereof, wherein various modifications are conceivable within the scope of the appended claims. Features of respective embodiments may for instance be combined.

The invention claimed is:

1. A method of joining tubular members, comprising the steps of:
    providing a first tubular member having a first end connection part;
    providing a second tubular member having a second end connection part configured to make-up a connection with the first end connection part;
    arranging an amount of filler material on at least a portion of a mating surface of at least one of the first end connection part and the second end connection part;
    joining the first tubular member and the second tubular member by making-up the first end connection part and the second end connection part while applying a first torque, wherein the filler material is compressed between the first end connection part and the second end connection part;
    heating the joined first end connection part and the second end connection part to a first temperature below the melting temperature of the filler material;
    applying a second torque, exceeding the first torque;
    raising the temperature to a second temperature at or above the melting temperature of the filler material to cause diffusion bonding among the filler material and the first and second end connection parts;
    lowering the applied second torque; and
    cooling the connection of the first end connection part and the second end connection part.

2. The method of claim 1, comprising the step of expanding the joined tubular members, including the connection of the first end connection part and the second end connection part.

3. The method of claim 1, wherein the step of heating the joined first end connection part and the second end connection part to a first temperature, includes maintaining the temperature at the first temperature for a time period (t2-t3), for equalizing the temperature in the connection.

4. The method of claim 3, wherein the time period (t2-t3) is at least:

$$t = 6.4 \cdot 10^{(-5)} \cdot h \cdot [((D^2 - d^2) \cdot \pi)/4]$$

wherein t is time in seconds; h is the height of the connection in mm; D is the OD of the pipe (in mm); and d is the ID of the pipe (in mm).

5. The method of claim 1, wherein the first temperature is in the range of about 75% to 95% of the melting temperature of the filler material.

6. The method of claim 1, wherein the second temperature is about the melting temperature of the filler material up to about 20 degree C. higher.

7. The method of claim 1, wherein a combined amount of filler material on the first end connection part and the second end connection part together provides a filler material volume which is about equal to up to about 50% greater than a gap volume between the first end connection part and the second end connection part of the made-up connection.

8. The method of claim 1, wherein the amount of filler material on the first end connection part and the second end connection part together provides a filler material volume which is about 50% greater than a gap volume between the first end connection part and the second end connection part of the made-up connection.

9. The method of claim 1, wherein the step of cooling the joined first and second end connection parts excludes cooling by liquid until the joined first and second end connection parts have a temperature below a third temperature.

10. The method of claim 1, wherein the first end connection part and the second end connection part are non-threaded.

11. The method of claim 1, wherein the filler material is selected from the group of Ag50-Cu20-Zn28-Ni2 (SilverBraz50Ni2™ (BAg-24)) and Ag49-Cu16-Zn23-Mn7.5-Ni4.5 (Brazetec 4900™ (BAg-21)).

12. The method of claim 1, wherein the step of arranging an amount of filler material includes:
   heating the filler material to a temperature at or above a melting temperature of the filler material; and
   deposition of the filler material using thermal spraying.

13. The method of claim 1, wherein the filler material is applied to the first end connection part and/or the second end connection part in a layer having a thickness in the range of about 0.1 to 0.2 mm.

14. The method of claim 1, wherein the filler material includes a brazing material, and wherein a brazing flux is applied to a surface selected from the first end connection and the second end connection.

15. A connector assembly:
   connected using the method of claim 1.

16. The method of claim 1, wherein the second torque exceeds the first torque at least twofold.

* * * * *